United States Patent
Duschatko et al.

(10) Patent No.: US 6,735,197 B1
(45) Date of Patent: May 11, 2004

(54) CONCATENATION DETECTION ACROSS MULTIPLE CHIPS

(75) Inventors: Douglas E. Duschatko, McKinney, TX (US); Lane Byron Quibodeaux, Allen, TX (US); Robert A. Hall, Richardson, TX (US); Andrew J. Thurston, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 587 days.

(21) Appl. No.: 09/608,097

(22) Filed: Jun. 30, 2000

Related U.S. Application Data

(60) Provisional application No. 60/211,830, filed on Jun. 15, 2000.

(51) Int. Cl.[7] .............................................. H04L 12/26
(52) U.S. Cl. ........................ 370/386; 370/392; 370/406; 370/466; 370/469; 370/510; 370/512
(58) Field of Search ................................. 370/393, 510, 370/512, 541, 386, 392, 406, 466, 469; 375/366

(56) References Cited

U.S. PATENT DOCUMENTS

| | | | | |
|---|---|---|---|---|
| 5,257,261 A | * | 10/1993 | Parruck et al. ............. | 370/522 |
| 5,751,954 A | * | 5/1998 | Saito ......................... | 709/245 |
| 6,041,043 A | * | 3/2000 | Denton et al. .............. | 370/254 |
| 6,058,119 A | * | 5/2000 | Engbersen et al. ......... | 370/466 |
| 6,147,968 A | * | 11/2000 | De Moer et al. ........... | 370/225 |
| 6,262,975 B1 | * | 7/2001 | Derbenwick et al. ....... | 370/244 |
| 6,636,529 B1 | * | 10/2003 | Goodman et al. .......... | 370/469 |

OTHER PUBLICATIONS

Liu et al., "A Single Chip Solution of Dual–Gigabit Ethernet over 2.5G SDH/SONET", Jun. 2002, pp. 1310–1314.*

* cited by examiner

Primary Examiner—Ricky Ngo
Assistant Examiner—Alan V. Nguyen
(74) Attorney, Agent, or Firm—Campbell Stephenson Ascolese, LLP

(57) ABSTRACT

An apparatus and method for detecting concatenation of payload data for an communication circuit is disclosed, wherein the payload data is dispersed over a first integrated circuit and one or more subsequent integrated circuits. The method and apparatus include determining whether each of the one or more subsequent integrated circuits have all channels therein designated as concatenation slaves, and communicating the determination to the first integrated circuit, the determination indicating that the one or more subsequent integrated circuits. According to an embodiment, the method and apparatus further include coupling the first integrated circuits to the one or more subsequent integrated circuits. The apparatus and method further include detecting concatenation on a first integrated circuit of the one or more integrated circuits, assigning one or more bi-directional ports coupled to the first integrated circuit as an input port, assigning each bi-directional port coupled to the one or more subsequent integrated circuits as output ports, and if any one integrated circuit among the subsequent integrated circuits includes a channel therein designated as a slave channel, providing an active high signal to the output port, the active high signal coupled to the input port of the first integrated circuit.

21 Claims, 10 Drawing Sheets

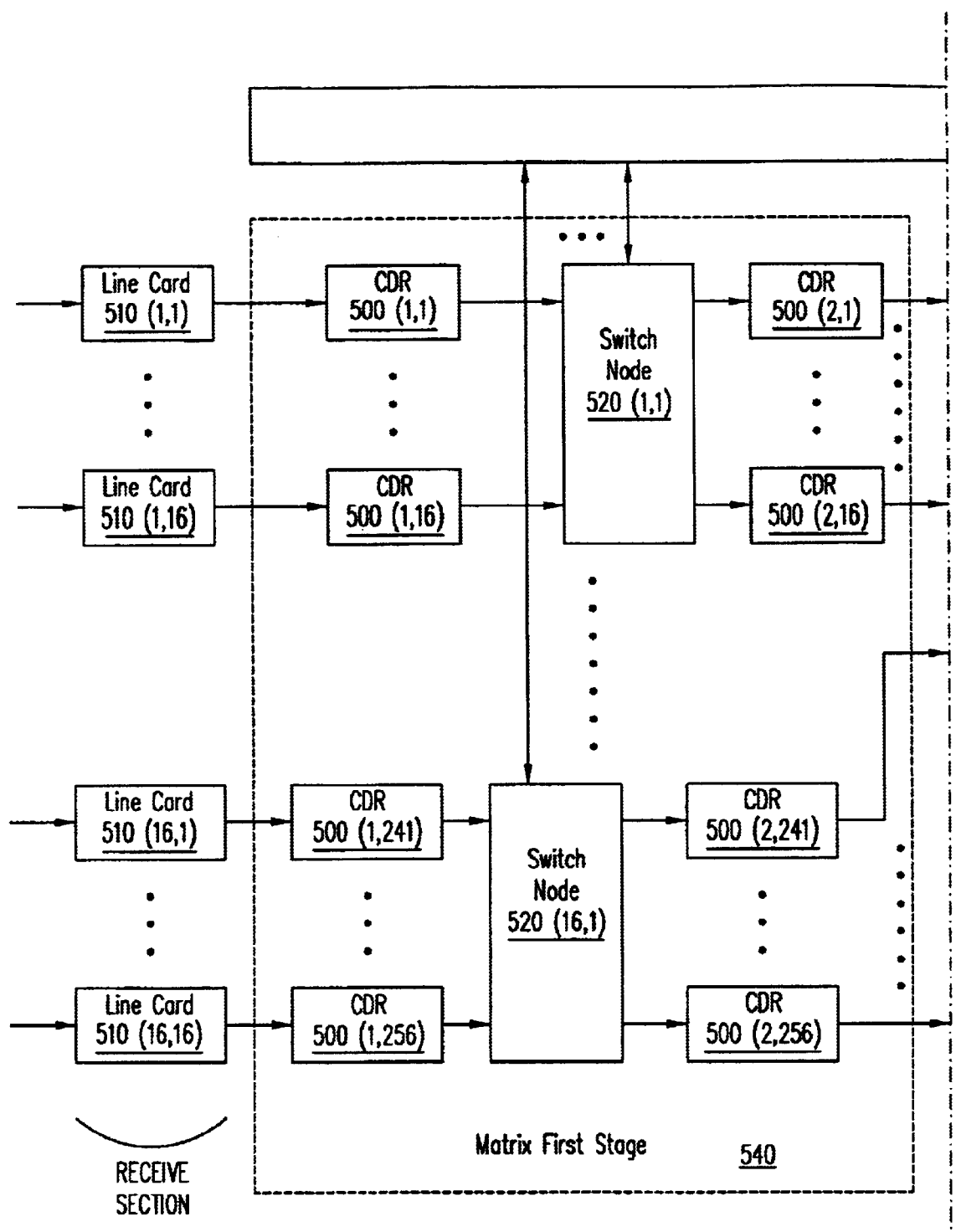
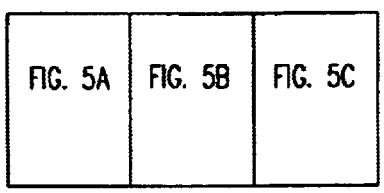
FIG. 5A
Key To
FIG. 5

CONCATENATION DETECTION ACROSS MULTIPLE CHIPS

This application claims the benefit of Provisional Application No. 60/211,830, filed Jun. 15, 2000.

CROSS-REFERENCES TO RELATED APPLICATIONS

This application is related to patent application Ser. No. 09/477,166, filed Jan. 4, 2000, and entitled "METHOD AND APPARATUS FOR A REARRANGEABLY NON-BLOCKING SWITCHING MATRIX," having A. N. Saleh, D. E. Duschatko and L. B. Quibodeaux as inventors. This application is assigned to Cisco Technology, Inc., the assignee of the present invention, and is hereby incorporated by reference, in its entirety and for all purposes.

This application is related to patent application Ser. No. 09/232,395, filed Jan. 15, 1999, and entitled "A CONFIGURABLE NETWORK ROUTER," having H. M. Zadikian, A. N. Saleh, J. C. Adler, Z. Baghdasarian, and V. Parsi as inventors. This application is assigned to Cisco Technology, Inc., the assignee of the present invention, and is hereby incorporated by reference, in its entirety and for all purposes.

This application is related to patent application Ser. No. 09/609,577 filed Jun. 30, 2000, and entitled "FIXED ALGORITHM FOR CONCATENATION WIRING," having Robert A. Hall, and V. Parsi as inventors. This application is assigned to Cisco Technology, Inc., the assignee of the present invention, and is hereby incorporated by reference, in its entirety and for all purposes.

This application is related to patent application Ser. No. 09/607,912 filed Jun. 30, 2000, and entitled "PATH AIS INSERTION FOR CONCATENATED PAYLOADS ACROSS MULTIPLE CHIPS," having Douglas E. Duschatko, Lane Byron Quibodeaux, Robert A. Hall, Andrew J. Thurston as inventors. This application is assigned to Cisco Technology, Inc., the assignee of the present invention, and is hereby incorporated by reference, in its entirety and for all purposes.

This application is related to patent application Ser. No. 09/608,461 filed Jun. 30, 2000, and entitled "CHANNEL ORDERING FOR COMMUNICATION SIGNALS SPLIT FOR MATRIX SWITCHING," having Douglas E. Duschatko, Lane Byron Quibodeaux, Robert A. Hall, Andrew J. Thurston as inventors. This application is assigned to Cisco Technology, Inc., the assignee of the present invention, and is hereby incorporated by reference, in its entirety and for all purposes.

BACKGROUND OF THE INVENTION

1. Field of the Invention

The present invention relates to data communications, and, more particularly, efficiency in data communication circuits.

2. Description of the Related Art

A data communications network is the interconnection of two or more communicating entities (i.e., data sources and/or sinks) over one or more data links. A data communications network allows communication between multiple communicating entities over one or more data communications links. High bandwidth applications supported by these networks include streaming video, streaming audio, and large aggregations of voice traffic. In the future, these demands are certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is among those protocols designed to employ an optical infrastructure and is widely employed in voice and data communications networks. SONET is a physical transmission vehicle capable of transmission speeds in the multi-gigabit range, and is defined by a set of electrical as well as optical standards.

In some networks, network nodes store data which they use for proper operation. In SONET, data between adjacent nodes are transmitted in modules called STS's (synchronous transport signals). Each STS is transmitted on a link at regular time intervals (for example, 125 microseconds). See Bellcore Generic Requirements document GR-253-CORE (Issue 2, December 1995) incorporated herein by reference. An STS-1 is a Synchronous Transport Signal-level 1 is the basic module in SONET and is defined as a specific sequence of 810 bytes (6480 bits) including overhead bytes and an envelope capacity for transporting payloads. In general, the higher-level signals, the STS-N signals, are lower-level modules that are multiplexed together and converted to an OC-N or STS-N signal. An STS-N frame is a sequence of N×810 bytes wherein N is a predetermined number. An STS-N is formed by byte-interleaving of STS-1 and STS-M modules, wherein M is less than N.

In some systems, such as certain ISDN and ATM systems, multiple STS-1 payloads are transported as super rate payloads. To accommodate such a payload an STS-Nc module is formed by linking N constituent STS-1s together in fixed phase alignment. The payload is then mapped into a single STS-Nc Synchronous Payload Envelope (SPE) for transport. Network equipment supporting the multiplexing, switching or transport of STS-Nc SPES treat an STS-Nc SPE as a single entity. When an STS-Nc SPE is treated as a single entity, concatenation indicators are present in the second through the Nth STS payload pointers which show that the STS-1s in the STS-Nc are linked together. The concatenation indicators do not, however, indicate when a concatenated STS-Nc is spread across multiple ASICs (Application Specific Integrated Circuit). Moreover, typically ASIC devices have limited pin availability compounding the problem.

It is desirable to have a system and method for detecting a concatenated STS-Nc that is spread across multiple ASICs.

SUMMARY OF THE INVENTION

Accordingly a system and method for detecting concatenation of payload data in a communication circuit, wherein the payload data is dispersed over a first integrated circuit and one or more subsequent integrated circuits, includes determining whether each of the one or more subsequent integrated circuits have all channels therein designated as concatenation slaves, and communicating the determination to the first integrated circuit, the determination indicating that the one or more subsequent integrated circuits are concatenation slaves. According to an embodiment, the method includes coupling the first integrated circuits to the one or more subsequent integrated circuits. The method further includes detecting concatenation on a first integrated circuit of the one or more integrated circuits, assigning one or more bi-directional ports coupled to the first integrated circuit as an input port, assigning each bi-directional port coupled to the one or more subsequent integrated circuits as an output port, and if any one integrated circuit among the subsequent integrated circuits includes a channel therein designated as a slave channel, providing an active high signal to the output port, the active high signal coupled to the input port of the first integrated circuit.

In one embodiment, the concatenation detection includes coupling the integrated circuits with a wire. The wire is further coupled to a pull up resistor to enable an active low signal and a tri stated signal. In another embodiment, the integrated circuits are disposed on an ASIC.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise indicated.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

In addition, the division of the detailed description into separate sections is merely done as an aid to understanding and is in no way intended to be limiting.

An Exemplary Network Element

Figure 1A:
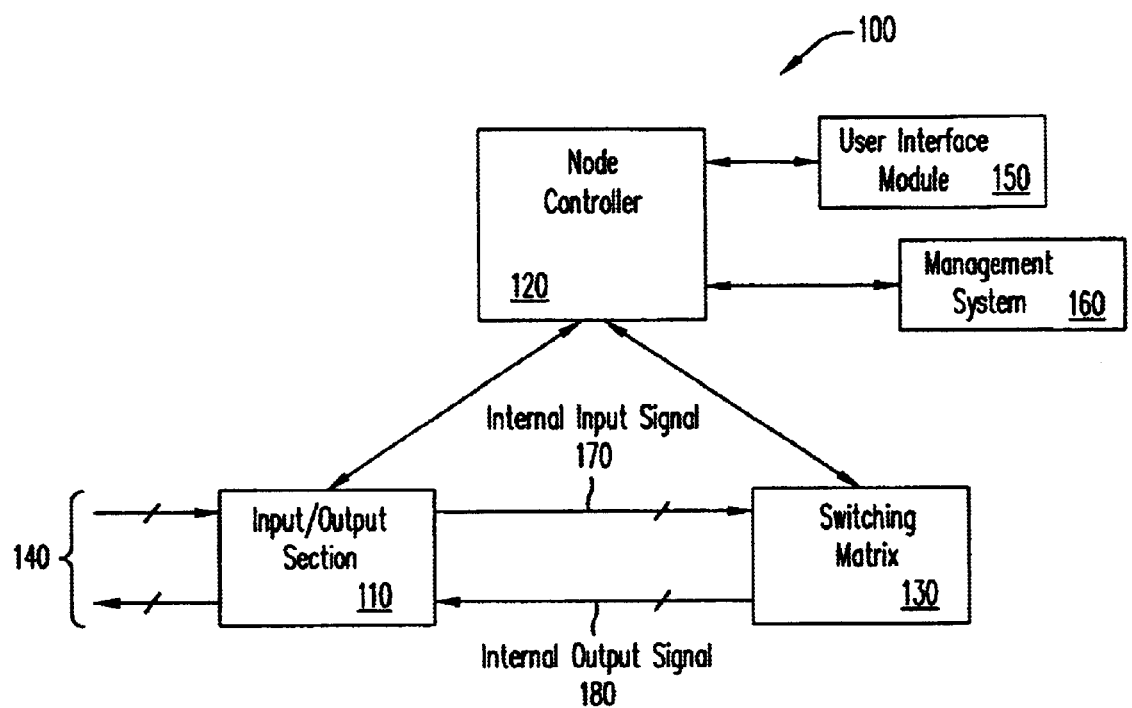
FIG. 1A is a block diagram of an exemplary router.

FIG. 1A illustrates a router 100. Router 100 includes an input/output section 110, a node controller 120, and a switching matrix 130. Node controller 120 contains, for example, real time software and intelligent routing protocols (not shown). Router 100 supports interfaces including, but not limited to, optical signal interfaces (e.g., SONET), a user interface module 150, and a management system 160. Internal input signals 170 and internal output signals 180 may be electrical or optical in nature.

Figure 1B:
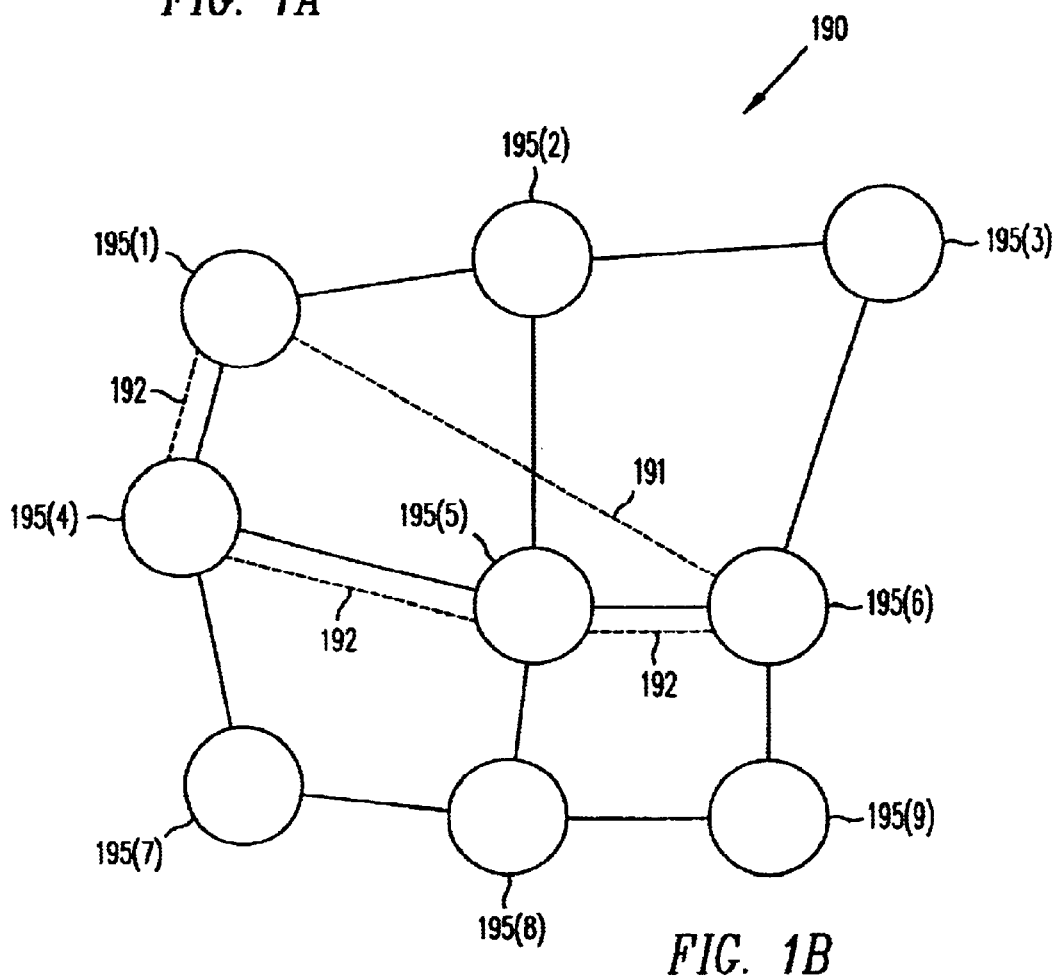
FIG. 1B is a block diagram of a network including a number of the routers of FIG. 1A.

FIG. 1B illustrates a network 190 that includes a number of nodes, network nodes 195(1)–(N). One or more of network nodes 195(1)–(N) can be a router such as router 100. Network 190 can thus support the automatic provisioning, testing, restoration, and termination of virtual paths (exemplified by a virtual path 191) over a physical path (exemplified by a physical path 192) from one of network nodes 195(1)–(N) to another of network nodes 195(1)–(N).

In one embodiment, there are at least three types of processors in a router 100. The lowest level, level-3, resides on the line card and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N). Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 2:
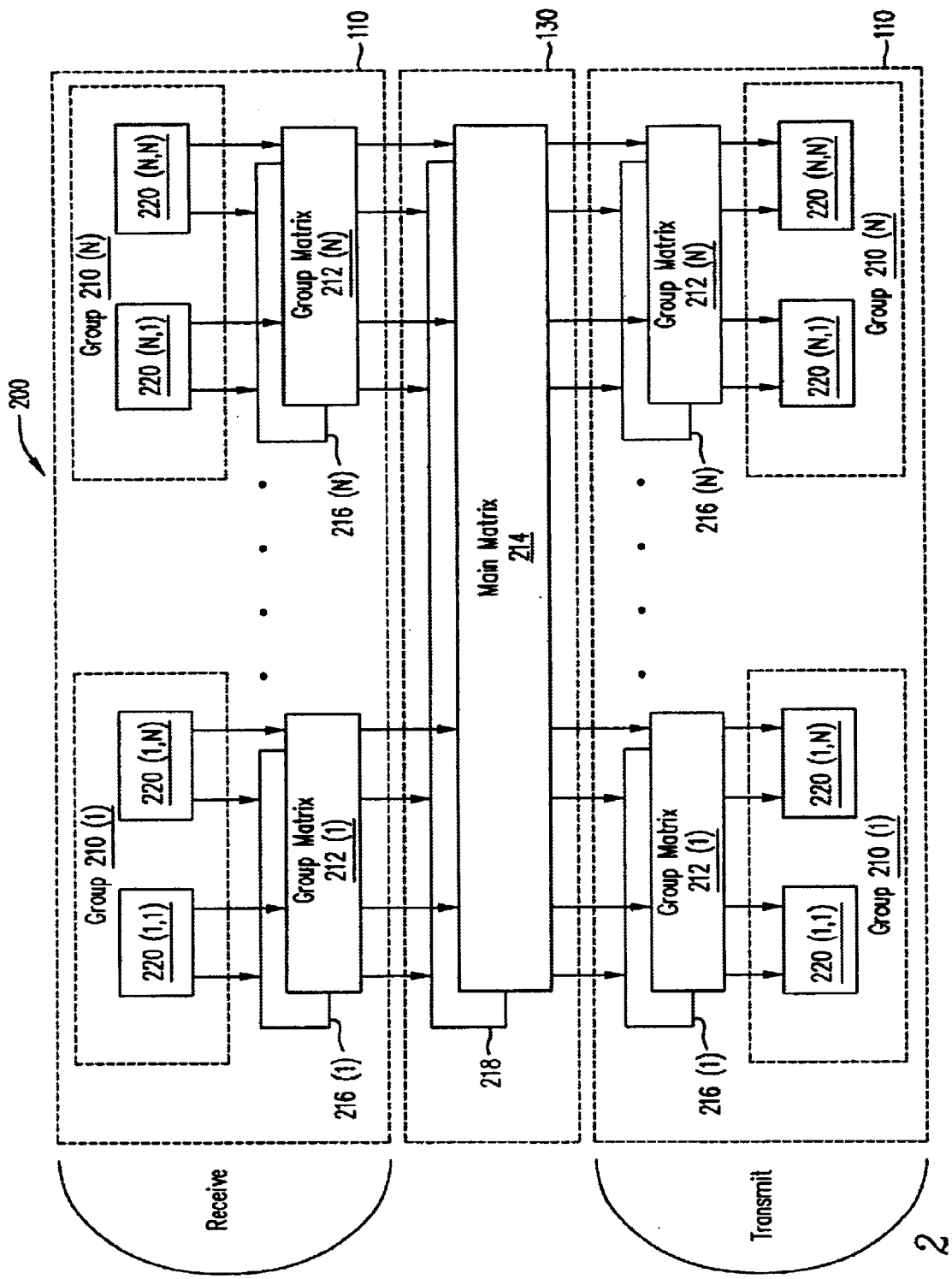
FIG. 2 is a block diagram of the signal paths and functional blocks of the router of FIG. 1A.

FIG. 2 is a block diagram of signal paths 200 within router 100. The primary signal paths in router 100 include one or more groups exemplified by groups 210(1)–(N), group matrices 212(1)–(N), and a main matrix 214. As depicted in FIG. 1A, groups 210(1)–(N), and group matrices 212(1)–(N) are shown as having receive and transmit sections. Groups 210(1)–(N) each include line cards 220(1,1)–(1,N), through line cards 220(N,1)–(N,N). Signals from line cards 220(1, 1)–(N,N) are sent to the corresponding group matrix. In one embodiment, two sets of the group matrix cards, group matrices 212(1)–(N) and 216(1)–(N) are employed. Main matrix 214 is also mirrored in one embodiment by a redundant copy, a backup main matrix 218, which together form switching matrix 130. As shown in FIG. 2, the redundancy for group matrices 212(1)–(N) (i.e., group matrices 216(1)–(N)), is also provided on the transmit side.

It will be noted that the variable identifier "N" is used in several instances in FIG. 2 (and subsequent use of other variables, such as "m," "x," "k," and others) to more simply designate the final element (e.g., group matrix 212(N), line card 220(N,N), and so on) of a series of related or similar elements (e.g., group matrices 212(1)–(N), line cards 220 (1,1)–(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m," "x," "k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)–(N,N). It is at this point, in a SONET-based system, that the Section and Line overheads are processed and stripped off by a protocol processor (not shown). The extracted SONET/SDH payload envelope is then synchronized with the system clock and sent to two different copies of a local matrix, depicted as group matrices 212(1)–(N) and 216(1)–(N) in FIG. 1A. In one embodiment, group matrices 212(1)–(N) and 216(1)–(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)–(N) and 216(1)–(N). In order to maximize bandwidth, it is preferable that only active signals be passed through to switching matrix 130.

In one embodiment, switching matrix 130 is an errorless, rearrangeably non-blocking switching network. In one embodiment, switching matrix 130 is a 256×256 switching network that consists of three columns and 16 rows of 16×16 switching elements that allow any of their inputs to be connected to any of their outputs. A single copy of the matrix may be housed, for example, in a single rack that contains three shelves, one for each column (or stage) of the matrix. Each one of such shelves contains cards housing the 16 switching elements in each stage. The switching element itself includes, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits the optical signal into two signals. One of the signals is sent to an active line card, while the other, when available, is sent to a backup card.

Line cards 220(1,1)–(N,N) receive optical signals from group matrices 212(1)–(N) and 216 (1)–(N) which are in turn connected to two separate copies of the main matrix. Line cards 220(1,1)–(N,N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)–(N,N) to select between the two copies of the group matrix without any level-1 or level-2 CPU intervention. This helps to ensure that such a switch can be made in 50 ms or less (per Bellcore's recommendations in GR-253 (GR-253: *Synchronous Optical Network* (SONET) *Transport Systems*, Common Generic Criteria, Issue 2[Bellcore, Dec. 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 3:
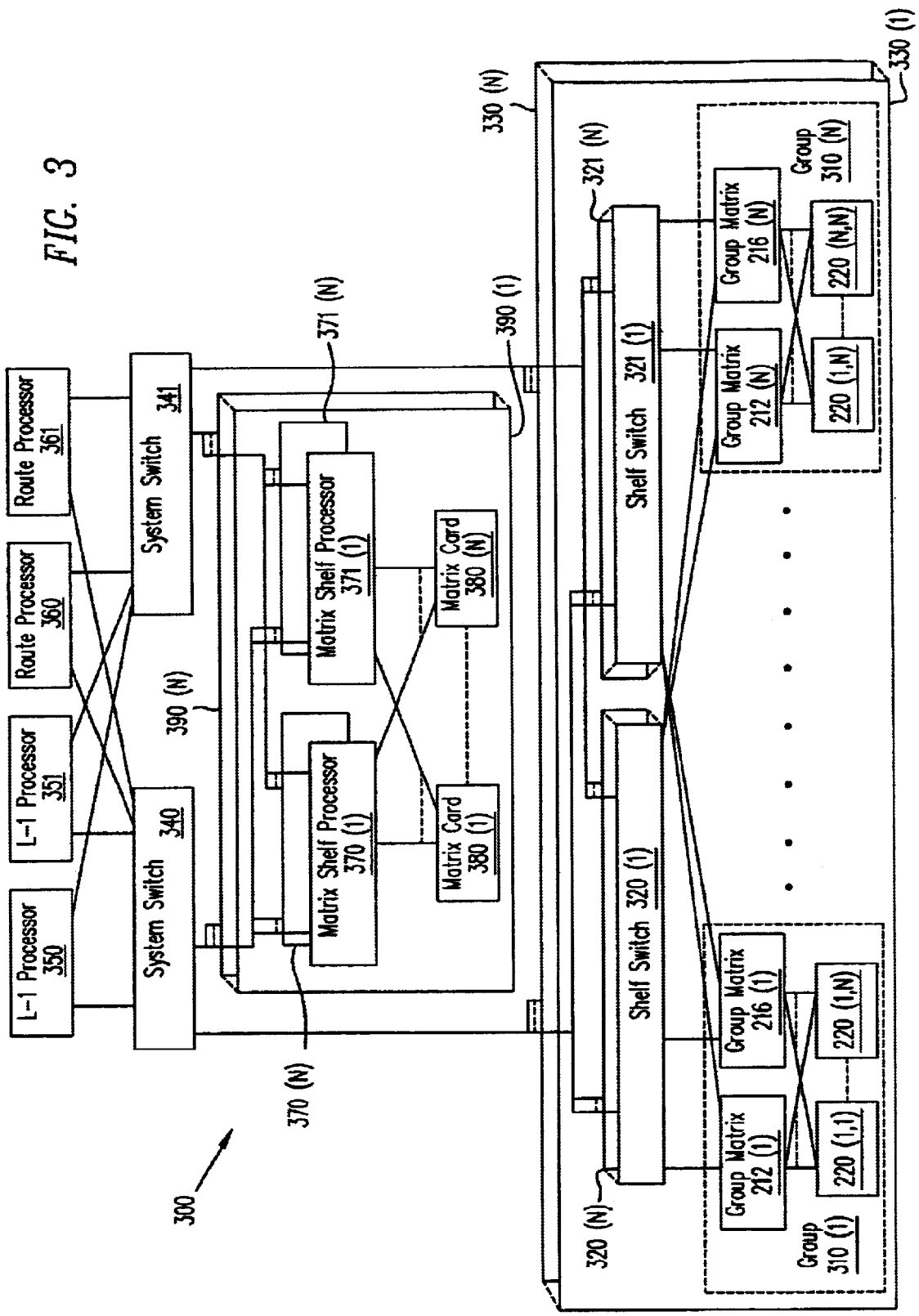
FIG. 3 is a block diagram of the control paths of the router of FIG. 1A.

FIG. 3 illustrates a control path 300 of a router, such as router 100. Control path 300 includes all non-payloadrelated flows within the system and the hardware and software necessary to the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)–(N) and 216(1)–(N). Each one of group matrices 212(1)–(N) and 216(1)–(N), also referred to herein as a hub, a repeater, or concentrator, is a physical layer device and preferably supports a star network topology, such as the IEEE 802.3 10BASE-T networking standard. The redundant connections from line cards 220(1, 1)–(N,N) in each of groups 310(1)–(N) are connected to two repeaters that reside on two separate copies of the group matrix module. Preferably, each one of line cards 220(1,1)–(N,N) supports two network ports (e.g., 10BASE-T Ethernet ports). The two sets of four signals from each port pass through a relay that selects one of them for connection to the LAN for purposes of redundancy. Groups 310(1)–(N) represent the first layer of the control bus hierarchy. Group matrices 212(1)–(N) and 216(1)–(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320(1)–(N) and 321(1)–(N), and groups 310(1)–(N). Groups 310(1)–(N) are again shown, with regard to the control functions thereof. In this depiction of groups 310(1)–(N), line cards 220(1,1)–(N,N) are shown as being attached to networking devices, indicated here as group matrices. Group matrices 212(1)–(N) and 216(1)–(N) may be, for example, multi-port Ethernet hubs running at 10 Mbps. Each of line cards 220(1,1)–(N,N) feed signals into two of group matrices 212(1)–(N) and 216(1)–(N). For example, line card 220(1,1) feeds received information to group matrices 212 (1) and 216(1). Group matrices 212(1)–(N) and 216(1)–(N) each feed a signal into shelf switches 320(1)–(N) and 321(1)–(N) of FIG. 2. Shelf switches 320(1)–(N) and 321 (1)–(N) are each controlled by a shelf processor (not shown for the sake of clarity) and communicate with one of the system switches (not shown, for the sake of clarity).

Shelf switches 320(1)–(N) and 321(1)–(N) are the next higher level of the control hierarchy in router 100, and are located on the shelf processor module (exemplified by line racks (330(1)–(N)). Each copy of shelf switches 320(1)–(N) and 321(1)–(N) interconnects six connections from the three groups in each shelf, another connection from the shelf processor, and one connection from system switch 340 (and 341). Shelf switches 320(1)–(N) and 32(1)–(N) can be implemented, for example, using an 8-port Ethernet configured to handle 10 Mbps Ethernet traffic and a single-port, dual-rate switch (e.g., 10 Mbps/100 Mbps Ethernet).

System Switch

The next level of the hierarchy is the system switch, of which there are two copies in each router. These are shown as system switches 340 and 341 in FIG. 3. This fully redundant scheme prevents failures on one switch from taking down the entire control bus. In one embodiment, a system switch manages connections from the following sources:

1. High-speed connection(s) from shelf switches 320(1)–(N) and 321(1)–(N);
2. High-speed connection(s) to higher-level processors (e.g., redundant level-1processors 350 and 351, and redundant route processors 360 and 361); and
3. High-speed connection(s) to matrix shelf processors 370(1)–(N) and 371(1)–(N) which, in turn, control matrix cards 380(1,1)–(1,N)), located in main matrix racks 390(1)–(N). It will be noted that main matrix 214 includes matrix cards 380(1,1)–(1,N), and that, more generally, main matrices 214 and 218 are included matrix racks 390(1)–(N).

System switches 340 and 341 are located in a management bay. As noted, the fully redundant switches manage connections from various router elements, such as I/O and matrix bays, level-1 processors, and route processors. Each of level-1 processors 350 and 351 and route processors 360 and 361 is preferably connected to system switches 340 and 341 using 100 Mbps Ethernet connections in a configuration that creates an expandable, efficient, and fully redundant control bus.

Physical Configurations and Modules

System Modules

Line Card

Figure 4:
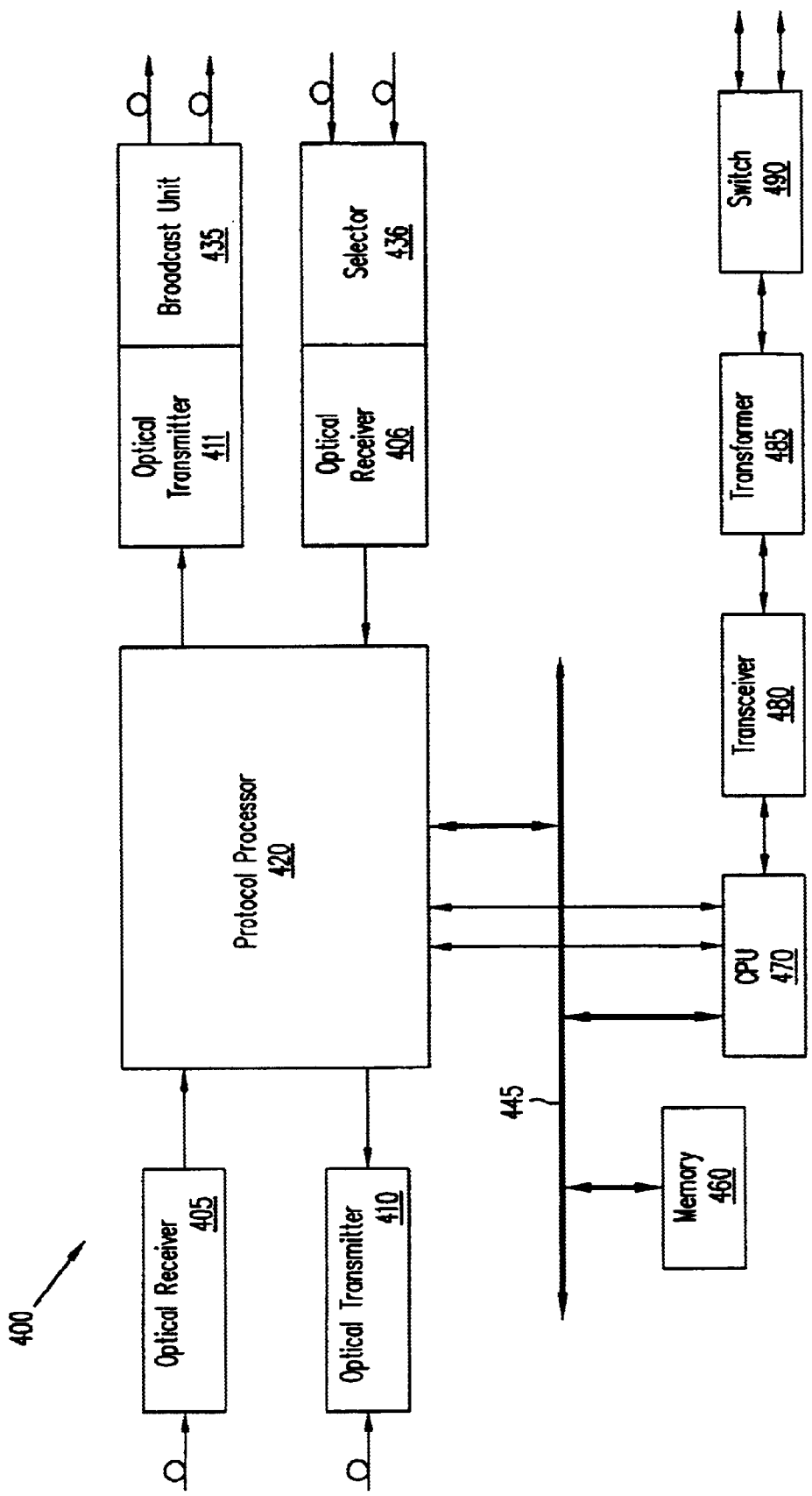
FIG. 4 illustrates the major components of one of the line cards.

FIG. 4 illustrates the major components of one of line cards 220(1,1)–(N,N), exemplified in FIG. 4 by a line card 400. A line card integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 400 receives optical signals from other network elements via a line-side optical receiver 405 and from the local router's system via a system-side optical receiver 406. Each of these receivers implements an optical-to-electrical (O/E) conversion function. Line card 400 transmits optical signals to other network elements using a line-side optical transmitter 410 and to the group matrices using a system-side optical transmitter 411. Each of these transmitters implements an electrical-to-optical (E/O) conversion function. It will be noted that line-side refers to the side of the line card coupled to other network elements and system-side refers to the side of the line card coupled to the group matrices.

Line-side optical receiver 405 is coupled to a protocol processor 420 which performs clock recovery multiplexing, demultiplexing, and SONET STE/LTE processing in both directions. Similarly, system-side optical receiver 406 is also coupled to protocol processor 420 to allow protocol processor 420 to receive optical signals. The processed electrical signals from protocol processor 420 are coupled to the transmitters 410 and 411. The clock recovery functions are combined with demultiplexers and multiplexers to support reception and transmission of the optical data, respectively. The multiplexers serialize output data generated in protocol processor 420 by performing parallel-to-serial conversion on the parallel data. In contrast, de-multiplexers are used in protocol processor 420 to perform serial-to-parallel conversion on received data.

In order to add protection channels, line-side optical transmitter 410 is also coupled to a 1:2 broadcast unit 435. To receive such optical signals, optical receiver 406 is also coupled to a 2:1 selector 436 in order to select the working channel before the optical signals leave the shelf and thus prevent the standby channel (also referred to herein as the protect channel) from using any bandwidth on switching matrix 130.

Protocol processor 420 is coupled to a bus 445. Protocol processor 420 interfaces the line card to two copies of the matrix in a 1+1 physical protocol. In a SONET implementation, protocol processor 420 provides both STE/LTE processing according to published industry standards. Also coupled to bus 445 are a memory 460 and a CPU 470. Memory 460 should be fast enough for efficient operation of CPU 470.

CPU 470 communicates with other of line cards 220(1,1)–(N,N) over a control bus (not shown) using a transceiver 480 that is coupled to CPU 470. Transceiver 480, is coupled to a transformer 485 which is coupled to a switch 490. Switch 490 is coupled to the control bus. Switch 490 implements a 1:1 protection scheme for transceiver 480 and couples CPU 470 to two independent ports on the backplane (not shown). Each of the two ports connects to one copy of the hub of the group matrix. This allows the software on the line card to switch to the backup link when the software detects failures on the active link.

Preferably, CPU 470 includes numerous integrated peripherals including embedded SCC channels (e.g., in-band communications) and an Ethernet controller (for example, to support communications with other system modules). In one embodiment, CPU 470 provides an onboard communications processor module (not shown) that handles time-critical aspects of the protocols supported.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

Shelf Processor Module

A shelf processor module provides, among other elements, a shelf processor and switch that interconnect the LAN segments from the groups and the shelf processor to a port on the shelf switch.

The shelf processor is responsible for the overall operation, management, and control of the shelf.

A network switch interconnects the lower speed inter-processor communication network segments in each shelf. In one embodiment, the network switch provides support for 10 Mbps and 100 Mbps segments.

In certain embodiments, the shelf processor is able to connect to two separate Ethernet segments. This can implement a 1:1 protection scheme that allows the shelf processor to recover from failures on the active segment by simply switching to the other segment.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Management Bay

The management bay can house, for example, the following modules:

1. Level-1 processors, or system controllers, and their associated storage devices;
2. Route processors;
3. Optional group and WAN cards;
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/System Controller

A system controller (also referred to herein as a level-1 processor) provides overall control of router 100. The system controller also communicates with the system switches. The system controller includes a bus such as an all-purpose bus (APB), which in turn provides access to several bus and communications controllers. Among the controllers interfaced to the APB is a bus bridge, a peripheral interface, and an I/O interface. The I/O interface may provide functionality such as 10 Mbps/100 Mbps Ethernet communications. The I/O interface also supports peripherals such as keyboards, mice, floppy drives, parallel ports, serial ports, and the like. The bus bridge allows communications between the system controller's processor and other devices. The peripheral interface allows communications with peripherals such as hard disks. The system controller performs various functions, such as communicating with the route processor (s) to determine how the matrix should be configured, managing the router's resources, and similar duties.

APB may also be connected to a dual-channel serial communication controller (SCC), for example, which can be used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the system controller.

Main Matrix Bay

Switching matrix 130 is based on a rearrangeably non-blocking switching matrix and can consist, for example, of switch nodes arranged in a staged array. For example, switching matrix 130 configured as a 256×256 switching matrix consists of 48 nodes arranged in an array of 16 rows by 3 columns, with each column containing one stage. All 48 nodes in the switch matrix are substantially similar. Each node is preferably a crossbar device, such as a 16×16 crossbar device that allows any of its 16 inputs to be connected to any of its 16 outputs, regardless of the crossbar's current state.

Figure 5B:
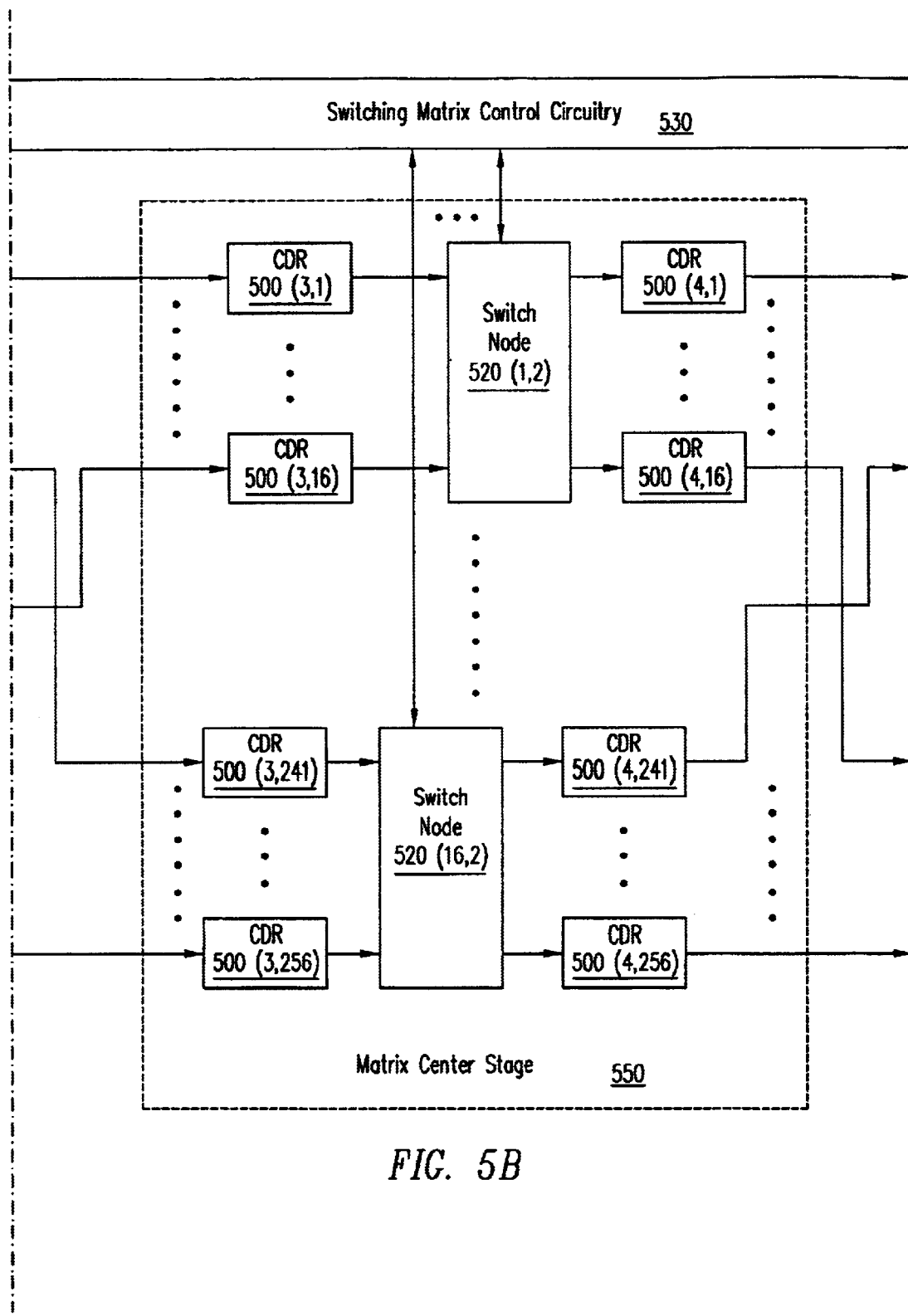
FIG. 5 illustrates a view of a switching matrix that includes clock/data recovery units and connections to the line cards.
Figure 5C:
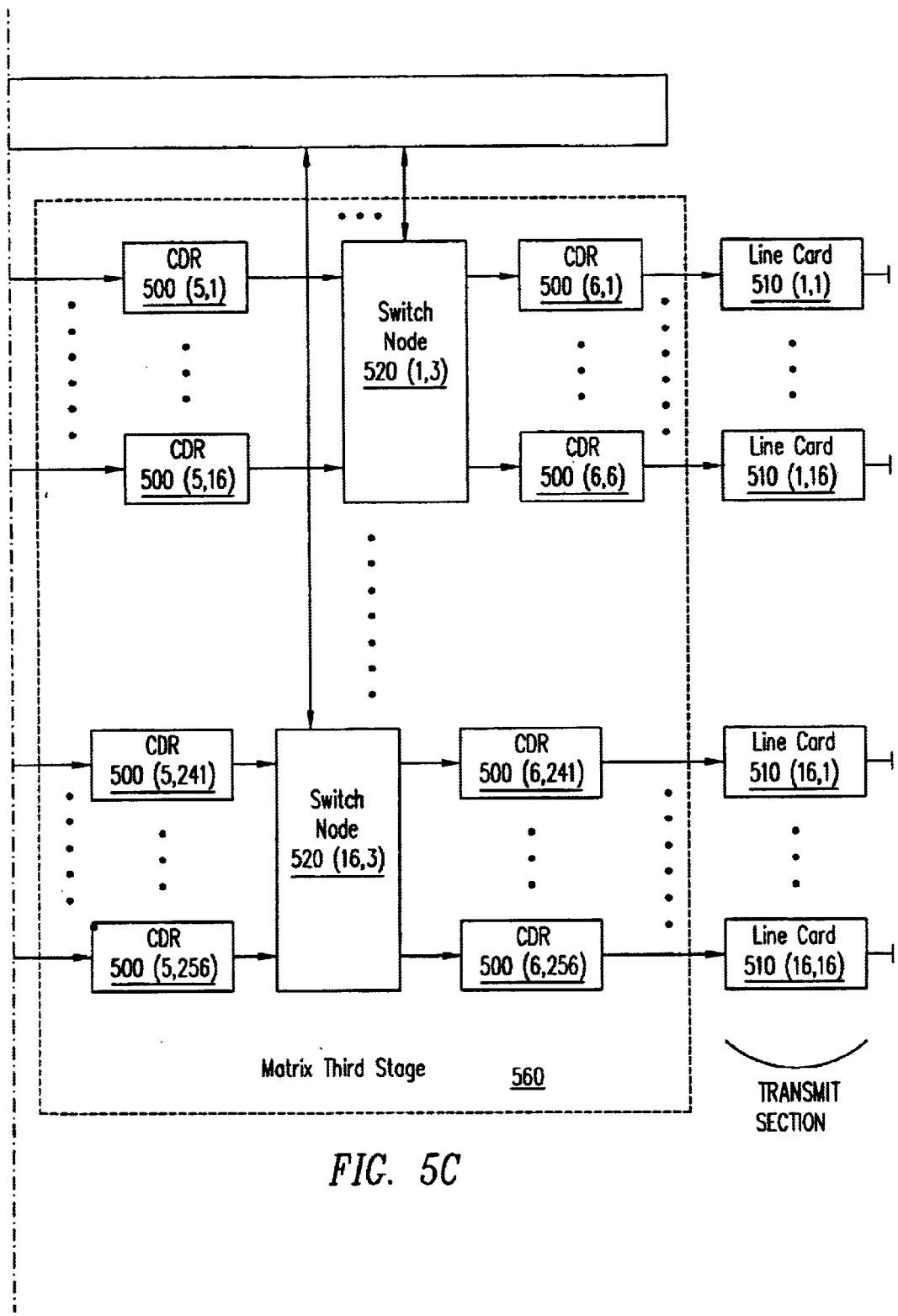

FIG. 5 illustrates a simplified view of switching matrix 130, including connections to the line cards. The depiction of switching matrix 130 in FIG. 5 shows certain other details, such as clock/data recovery units (CDRs) 500(1,1)–(6,256) and line cards 510(1,1)–(16,16). A CDR recovers clock and data information from a serial bitstream by recovering the clocking signal from the incoming bitstream (e.g., using a phase-locked loop (PLL)), and then recovering the data using the clock thus recovered.

It will be noted that line cards 510(1,1)–(16,16) correspond loosely to line cards 220(1,1)–(N,N), as depicted in FIG. 2. It will also be noted that line cards 510(1,1)–(16,16) are each shown as being divided into a receive section and a transmit section as shown in FIG. 5, again in a fashion similar to that depicted in FIG. 2. Also depicted in FIG. 5 are switch nodes 520(1,1)–(16,3) and a switching matrix control circuit 530. More generically, the control function represented by switching matrix control circuitry 530 is depicted in FIG. 3 as matrix shelf processors 370(1)–(N) and 371(1)–(N). As previously noted, switch nodes 520(1,1)–(16,3) and their related CDRs are divided into three stages, which are depicted in FIG. 5 as matrix first stage 540, matrix center stage 550, and matrix third stage 560. It will be noted that matrix first stage 540, matrix center stage 550, and matrix third stage 560 correspond to the matrix stages represented by switch nodes 1100(1,1)–(16,1), switch nodes 1100(1,2)–(16,2), and switch nodes 1100(1,3)–(16,3). It will also be noted that the transmit side of line cards 510(1,1)–(16,16) each include CDR functionality.

SONET Frame

Figure 6:
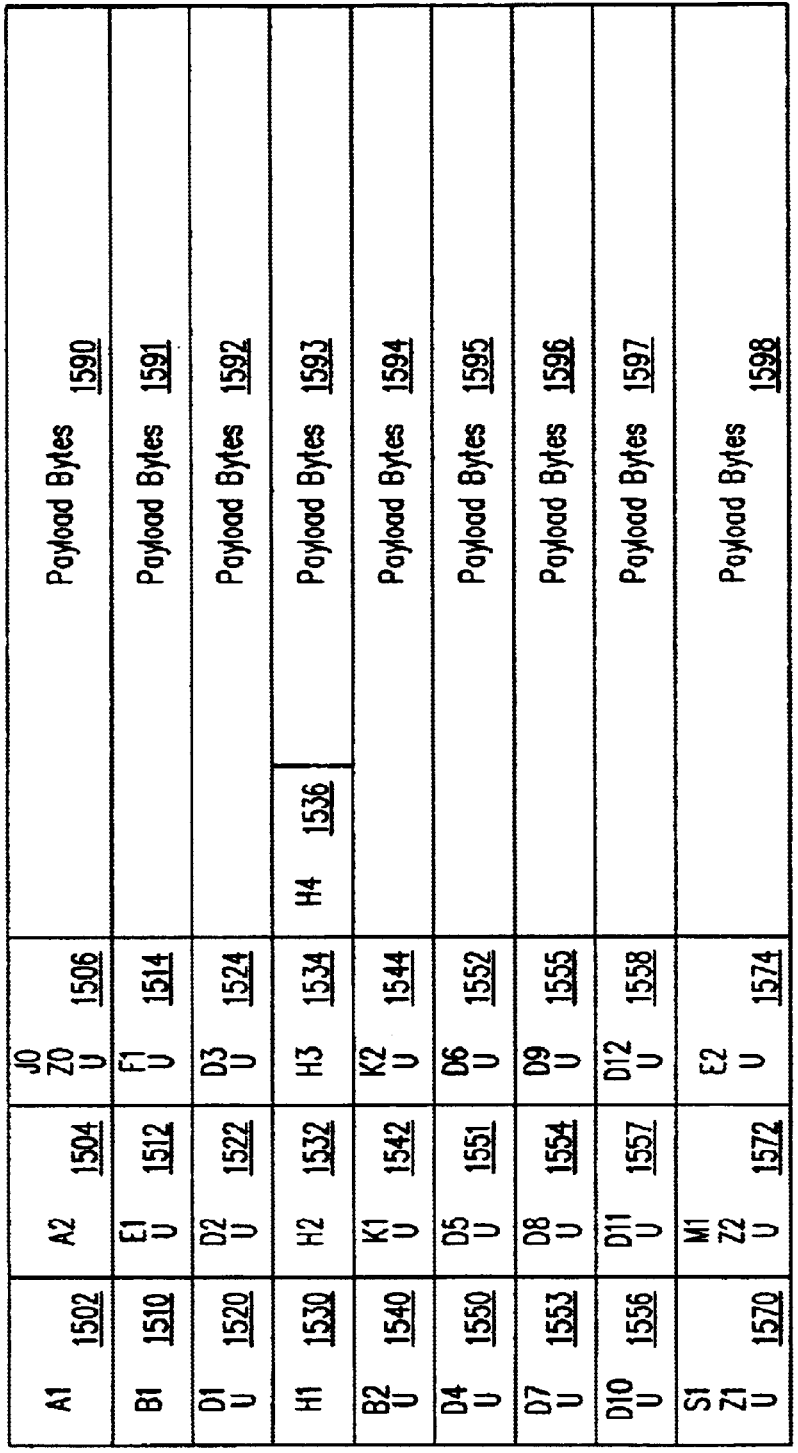
FIG. 6 illustrates a standard frame of the synchronous optical network protocol.

FIG. 6 illustrates a standard frame of the synchronous optical network (SONET) protocol, exemplified here by a SONET frame 1500. SONET frame 1500 is divided horizontally into ninety columns and is divided vertically into nine rows. The first three columns of SONET frame 1500 contain overhead bytes used for framing, communications, and other purposes. The remaining 87 columns contain data and are collectively referred to as payload. The overhead bytes include an A1 byte 1502, an A2 byte 1504, a J0/Z0 byte 1506, a B1 byte 1510, an E1 byte 1512, an F1 byte 1514, a D1 byte 1520, a D2 byte 1522, a D3 byte 1524, an H1 byte 1530, an H2 byte 1532, an H3 byte 1534, an H4 byte 1536, a B2 byte 1540, a K1 byte 1542, a K2 byte 1544, a D4 byte 1550, a D5 byte 1551, a D6 byte 1552, a D7 byte 1553, a D8 byte 1554, a D9 byte 1555, a D10 byte 1556, a D11 byte 1557, a D12 byte 1558, an S1/Z1 byte 1570, an M1/Z2 byte 1572, and an E2 byte 1574. Also included in SONET frame 1500 is payload data, represented here by payload bytes 1590–1598. It will be noted that each of payload bytes 1590–1598 includes 87*48 bytes of data for an OC-48 SONET frame (except payload bytes 1593, which includes 86*48 bytes of data (due to the existence of H4 byte 1536)).

Concatenated Payloads

For a SONET system to function as an OC-192 system, data payloads are typically concatenated for transmission. Accordingly, integrated circuits, such as ASICs, are coupled to transmit the data.

Figure 7:
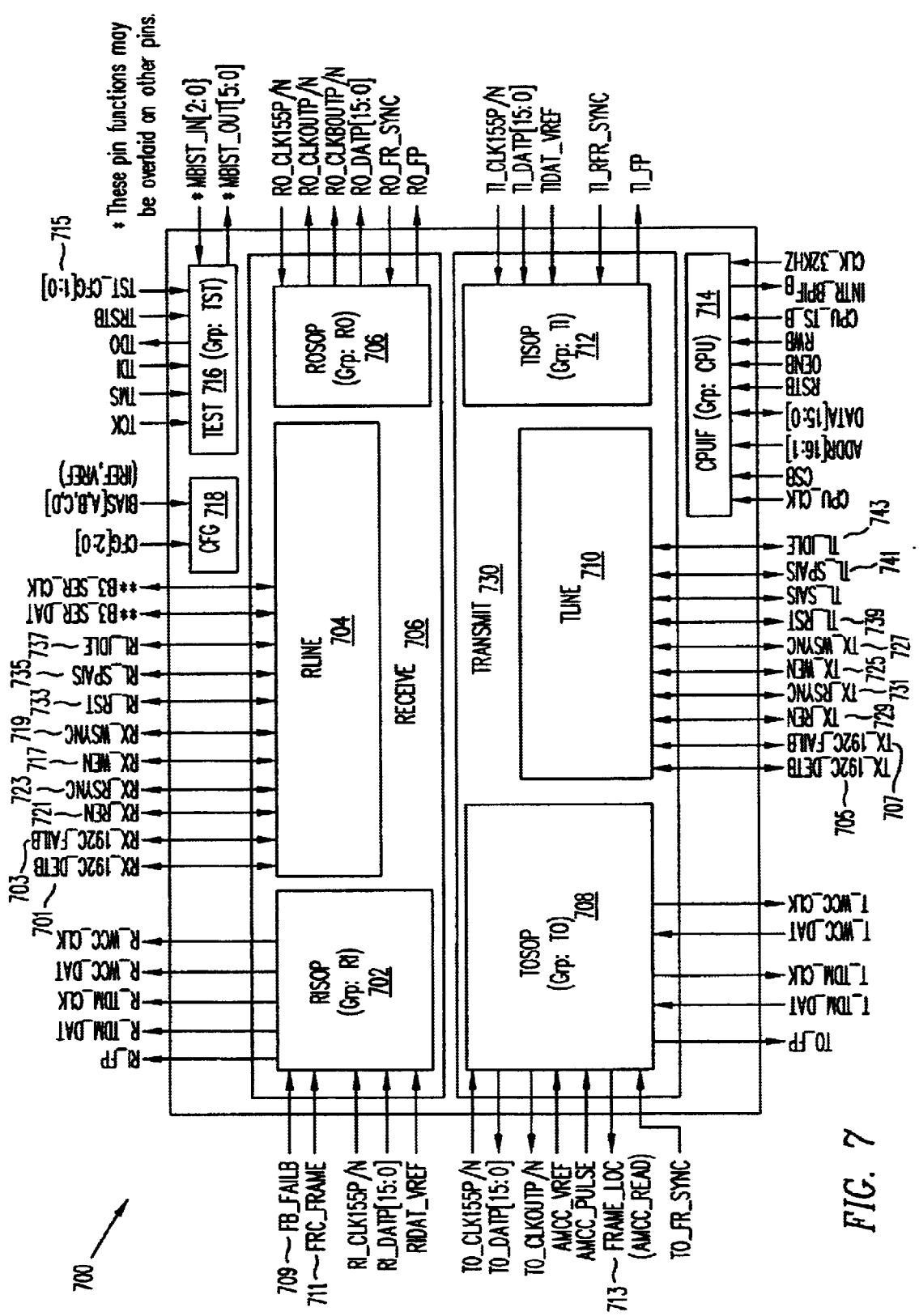
FIG. 7 illustrates a processor in accordance with an embodiment of the present invention.
Figure 8:
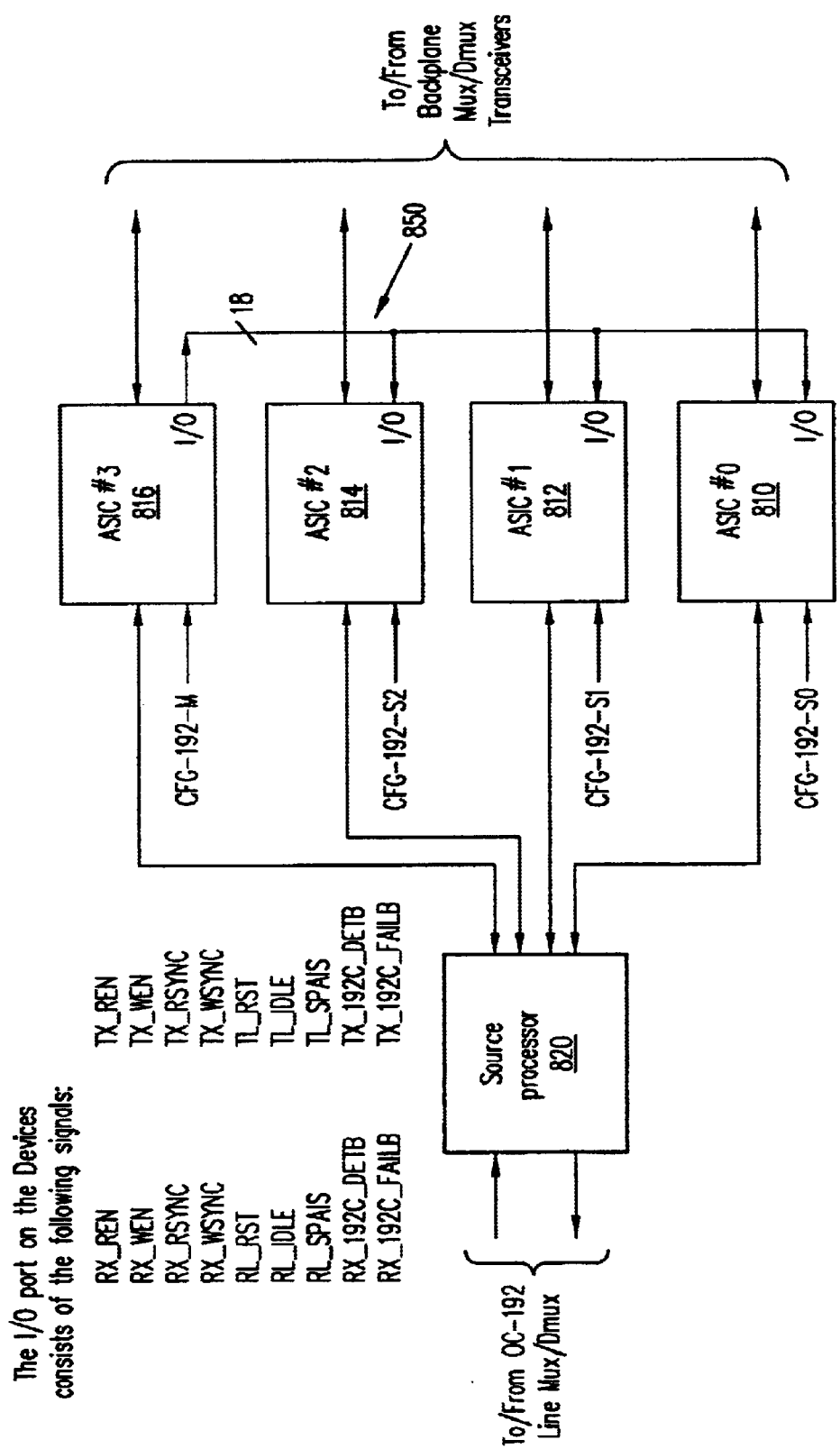
FIG. 8 illustrates a concatenation scheme in accordance with an embodiment of the present invention.

FIG. 7, as more fully described below, shows a processor in accordance with an embodiment of the invention, including pin descriptions allowing the processor to function as either a master or a slave processor in a line card. FIG. 8 demonstrates several processors, such as the processor shown in FIG. 7, coupled in a manner consistent with an embodiment of the present invention.

Referring now to Table 1, below, a typical STS SPE payload pointer for a SONET system is shown in bits 7 through 16. The table shows bits seven through sixteen are designated either "I" for an increment or "D" for decrement. These bits are typically designated as the pointer value to indicate the offset between the pointer word and the first byte of the STS SPE. In a concatenated payload, in which more than one STS-1 is used to carry an SPE, these bits are used to carry a concatenation indicator in the second through the nth STS-1. Thus, the concatenation detection requires the detection of the pointer word value to serially pass from the nth STS-1 to the first STS-1.

TABLE 1

| H1 byte | H2 byte | H3 byte | Byte 0 of payload |
|---|---|---|---|
| 1 2 3 4 5 6 7 8<br>N\|N\|N\|N\|—\|—\|I\|D | 9 10 11 12 13 14 15 16<br>I\|D\|I\|D\|I\|D\|I\|D\| | . . .<br>Negative Stuff Byte | . . .<br>Positive Stuff Byte |

The interconnected circuits shown in FIG. 8 allow a concatenated group of STS-1s in an STS-Nc to be dispersed across the processors 810, 812, 814 and 816. Each of the STS-1s contain part of the STS-Nc SPE rather than individual STS-1 SPEs.

According to the GR-253 specification, the STS-1s contain concatenation indicators contained in payload pointers of the second through nth STS-1s in an STS-Nc. The concatenation indicators show that the second through nth STS-1s each contain part of the STS-Nc SPE. The STS-1 in the master processor 816 would not typically have a concatenation indicator, but holds a normal pointer word. STS-1s in processors 810, 812 and 814 each have pointer values shown in bits 7 through 16 set to all ones, with N-bits set to 1001, giving a pointer word value of:1001 XX11 11111111. The pointer word value appears in the H1 and H2 bytes through the nth STS-1s, commonly referred to as "slave channels."

The GR-253 specification provides for concatenation detection by integrating the detection of the pointer word value over a number of frames. Accordingly, if a large concatenated signal is present, such as that required in an STS-192c payload, the integration data for each channel passes from integrated circuit to integrated circuit.

Referring to FIG. 7 in combination with Table 2, below, a communication processor in accordance with an embodiment supports OC-192. Accordingly, OC-192 support signals are communicated from a master processor to all of the slave processors attached thereto. Referring to FIG. 7, processor 700 determines whether it is a master or slave processor according to predetermined OC-192 support pins. The pins configure the ASIC 700 as in input or an output depending according to whether the particular ASIC is being operated in an OC-192 slave position or an OC-192 master position. External pins are used to specify to the device holding the master and slave processors the type of OC-192 position a particular ASIC processor occupies. Table 2 shows the configuration of pins indicating master and slave positions.

TABLE 2

OC-192 IO Pins on FIG. 7

| OC-192 Pin Name (IO Type) | Pin Function when device is OC-192 Master | Pin Function when device is OC-192 Slave |
|---|---|---|
| RX_192C_DETB 701 (Bidirectional) (logical-OR) | This signal is a logical OR function which is connected commonly to four or more ASIC devices in an OC-192c application and which is pulled up with a resistor on a circuit board. Any device that wishes to assert this signal as active should pull the signal down. Any device not asserting this signal will tristate its output driver. This negative true signal is monitored only by the master processor. An active low on this input indicates to the master processor that an OC-192c concatenated signal is present in the receive path signal. (This signal is necessary for the master processor to be able to distinguish an OC-192c concatenated signal from an OC-48c concatenated signal.) | This negative true signal is monitored AND driven by slave processors. A slave processor asserts this signal IF all 48 of its RLOP processors are detecting a concatenation indication in their H1 and H2 pointer bytes. An active low monitored on this signal indicates to the slave processor that an OC-192c concatenated signal is present in the receive path. This signal is monitored by the slave device (instead of the internal "assertion" signal that says drive this pin active) to allow for proper actions in the event that a particular slave processor has a failure (and ceases to indicate concatenation within itself). |
| RX_192C_FAILB 703 (Bidirectional) Logical OR) | This signal is a logical OR function which is connected commonly to each (four or more, typically) processor devices in an OC-192c application and which is pulled up with a resistor on the circuit board. Any device that wishes to assert this signal as active should pull the signal down. Any device not asserting this signal will tristate its output driver. This signal is not specific to either master or slave device. All processor devices have the capability to assert this signal and all processor devices monitor this signal. A processor asserts this signal if RX_192C_DETB is detected active AND one of the following conditions is detected in the RIS or RLOP sections: LOACLK (Loss of activity on Clock), LOADAT (Loss of activity on Data), OOF (Out of Frame), LOF (Loss of Frame), or LOP (Loss of Pointer). Any processor that detects this signal active will insert Path AIS in its transmit output stream onto the backplane. (for details on the errors that will assert this signal and the action taken when it is asserted.) Control bits in the RIS_CR control register used to inhibit/enable the assertion conditions mentioned above also affect whether those conditions affect this signal. | |
| TX_192C_DETB 705 (Bidirectional) (logical OR) | This signal is a logical OR function which is connected commonly to all four processor devices in an OC-192c application and which is pulled up with a resistor on the PCB. Any device that wishes to assert this signal as active should pull the signal down. Any device not asserting this signal will tristate its output driver. This negative true signal is monitored only by the master processor. An active low on this input indicates to the master Processor that an OC-192C concatenated signal is present on the transmit path signal. (This signal is necessary for the master processor to be able to distinguish an OC-192c concatenated signal from an OC-48c concatenated signal.) | This negative true signal is monitored AND driven by slave processors. A slave processor should assert this signal IF all 48 of its TLOP processors are detecting a concatenation indication in their H1 and H2 pointer bytes. An active low monitored on this signal indicates to the slave that an OC-192C concatenated signal is present in the transmit path signal. This signal is monitored by the slave device (instead of the internal "assertion" signal that says drive this pin active) to allow for proper actions in the event that a particular slave processor has a failure (and ceases to indicate concatenate within itself). |
| TX_192C_FAILB 707 (Bidirectional) (Logical OR) | This signal is a logical OR function which is connected commonly to four devices in an OC-192c application and which is pulled up with a resistor on the circuit board. Any device that wishes to assert this signal as active should pull the signal down. Any device not asserting this signal will tristate its output driver. This signal is not specific to either master or slave device. All processor devices have the capability to assert this signal and all devices monitor this signal. A processor asserts this signal if TX_192C_DETB is detected active AND one of the following conditions is detected in the TIS or TLOP sections: LOACLK (Loss of activity on Clock), LOADAT (Loss of activity on Data), OOF (Out of Frame), LOF (Loss of Frame), or LOP (Loss of pointer). Any processor that detects this signal active will insert Path AIS in its transmit output stream onto the SONET line. Control bits in the TIS_CR control register used to inhibit/enable the assertion conditions mentioned above also affect whether those conditions affect this signal. | |

TABLE 2-continued

OC-192 IO Pins on FIG. 7

| OC-192 Pin Name (IO Type) | Pin Function when device is OC-192 Master | Pin Function when device is OC-192 Slave |
|---|---|---|
| FB_FAILB 709 (Input) | This negative true input pin is not specific to either master or slave mode. This pin is received into the Receive Input section (RIS) of the processor. In CFG-192 mode, this input is used to indicate (when asserted) that the source processor OC-192 front end has detected an input line error and that the Processor should reset its RLOP FIFOs and insert path AIS (in all 48 channels) on the backplane. In CFG-48 mode, this input is used as a line side direct LOS (loss of signal) input from the optics module and indicates LOS when asserted low. | |
| FRC_FRAME 711 (Input) | This function is not specific to either master or slave mode. This function is received into the Receive Input Section (RIS) of the processor. This input is used to indicate that the processor should reset its framer and start frame search again. This input is required to avoid the latency of the processor detecting that it is out of frame after source processor has already detected that it is out of frame. When the source processor detects a condition that requires realignment of the frame position, it will assert this input into the processor device to force the new frame alignment to be recognized. | |
| FRAME_LOC 713 (Output) | This function is not specific to either master or slave mode. This signal is an output from the Transmit Output section (TOS) and is used by the source processor to know the frame location. This output is provided to the source processor so that a full framer is not required on the source processor input port that is receiving the processor transmit output data. This output is 155 MHz synchronous and will overlay on the CFG-48 AMCC_READ function. | |
| CFG[2:0] 715 (Input) | Tied high ('111') on circuit board. | Tied high ('100' -> '110') on PC board. (Three unique slave positions) |
| RX_WEN, 717 RX_WSYNC, 719 (Bidirectional) | These two pins are used to synchronously control writing of the receive path FIFO's (across four processor chips) when an OC-192c signal is present in the receive path. These pins are configured as output only from the CFG-192-M device and carry the values of the RLOP{47} FIFO write control signals. (RLOP{47} is the master channel processor for an OC-192c signal.) RX_WEN==Write Enable and RX_WSYNC==Write Sync. These pins are asserted synchronously with respect to the 6.48 MHz RI_CLK6 clock signal that is derived from the RI_CLK155 input clock. | These two pins are used to synchronously control writing of all 48 RLOP FIFO's in the receive path of a processor configured as CFG-192-S. These pins are configured as inputs and are received from the CFG-192-M device. The slave device only uses these inputs to control its 48 RLOP FIFO's when an OC-192c concatenated signal is present. For any (receive path) signal other than OC-192c, these inputs are ignored. See description in box to the left pin function. These pins are received synchronously with respect to the local RI_CLK6 clock in each of the slave devices. |
| RX_REN, 721 RX_RSYNC 723 (Bidirectional) | These two pins are used to synchronously control reading of the receive path FIFO's (across four processor chips) when an OC-192c signal is present in the receive path. These pins are configured as output only from the CFG-192-M device and carry the values of the RLOP{47} FIFO read control signals. (RLOP{47} is the master channel processor for an OC-192c signal.) RX_REN==Read Enable and RX_RSYNC==Read Sync. These pins are asserted synchronously with respect to the 6.48 MHz RO_CLK6 clock signal that is derived from the RO_CLK155 input clock. | These two pins are used to synchronously control reading of all 48 RLOP FIFO's in the receive path of a processor configured as CFG-192-S. These pins are configured as inputs and are received from the CFG-192-M device. The slave device only uses these inputs to control its 48 RLOP FIFO's when an OC-192c concatenated signal is present. For any (receive path) signal other than OC-192c, these inputs are ignored. See description in box to the left pin function. These pins are received synchronously with respect to the local RO_CLK6 clock in each of the slave devices. |
| TX_WEN, 725 TX_WSYNC, 727 (Bidirectional) | These two pins are used to synchronously control writing of the transmit path FIFO's (across four processor chips) when an OC-192c signal is present in the transmit path. These pins are configured as output only from the CFG-192-M device and carry the values of the TLOP{47} FIFO write control signals. (TLOP{47} is the master channel processor for an OC-192c signal.) TX_WEN==Write Enable | These two pins are used to synchronously control writing of all 48 TLOP FIFO's in the transmit path of a processor device configured as CFG-192-S. These pins are configured as inputs and are received from the CFG-192-M device. The slave device only uses these inputs to control its 48 TLOP FIFO's when an OC-192c concatenated signal is present. For any (transmit path) signal other than OC-192c, these |

TABLE 2-continued

OC-192 IO Pins on FIG. 7

| OC-192 Pin Name (IO Type) | Pin Function when device is OC-192 Master | Pin Function when device is OC-192 Slave |
|---|---|---|
| | and TX_WSYNC==Write Sync. These pins are asserted synchronously with respect to the 6.48 MHz TI_CLK6 clock signal that is derived from the TI_CLK155 input clock. | inputs are ignored. See description in box to the left pin function. These pins are received synchronously with respect to the local TI_CLK6 clock in each of the slave devices. |
| TX_REN, 729 TX_RSYNC 731 (Bidirectional) | These two pins are used to synchronously control reading of the transmit path FIFO's (across four processor chips) when an OC-192c signal is present in the transmit path. These pins are configured as output only from the CFG-192-M device and carry the values of the TLOP{47} FIFO read control signals. (TLOP{47} is the master channel processor for an OC-192c signal.) TX_REN==Read Enable and TX_RSYNC==Read Sync. These pins are asserted synchronously with respect to the 6.48 MHz TO_CLK6 clock signal that is derived from the TO_CLK155 input clock. | These two pins are used to synchronously control reading of all 48 TLOP FIFO's in the transmit path of a processor device configured as CFG-192-S. These pins are configured as inputs and are received from the CFG-192-M device. The slave device only uses these inputs to control its 48 TLOP FIFO's when an OC-192c concatenated signal is present. For any (transmit path) signal other than OC-192c, these inputs are ignored. See description in box to the left pin function. These pins are received synchronously with respect to the local TO_CLK6 clock in each of the slave processor devices. |
| RL_RST, 733 RL_SPAIS, 735 RL_IDLE 737 (Bidirectional) | These pins are configured as outputs of the OC-192 master processor. These signals are provided to allow synchronous control of all of the RLOPs not located in the CFG-192-M processor. The value driven on these signals is the (maskable) value of the corresponding bit in the GL_CR1 register OR the corresponding value in the RL_CR{47} register if the RX_192C_DETB signal is active. RL_RST==Reset, RL_SPAIS==Send Path AIS and RL_IDLE==idle. Refer to descriptions of the GL_CR1 register and the RL#CR{47} register for more detail regarding the usage and actions performed by these signals. These signals are driven synchronously with the CPU_CLK | These pins are configured as inputs by processors configured as CFG-192-S. The value received on these pins (from the master device) is OR'd internally with the corresponding bit values out of the local GL_CR1 register. These inputs are used to allow the master processor to control all of the RLOP's not within its own device for global software control or for global OC-192c signal management. Refer to descriptions of the GL_CR1 register and the RL_CR{47} register for more detail regarding the usage and actions performed by these signals. |
| TL_RST, 739 TL_SPAIS, 741 TL_IDLE 743 (Bidirectional) | These pins are configured as outputs of the OC-192 master processor. These signals are provided to allow synchronous control of all of the TLOPs not located in the CFG-192-M processor. The value driven on these signals is the (maskable) value of the corresponding bit in the GL_CR1 register OR the corresponding value in the TL_CR{47} register if the TX_192C_DETB signal is active. TL_RST==Reset, TL_SPAIS==Send Path AIS and TL_IDLE==Idle. Refer to descriptions of the GL_CR1 register and the TL_CR{47} register for more detail regarding the usage and actions performed by these signals. These signals are driven synchronously with the CPU_CLK | These pins are configured as inputs by processors configured as CFG-192-S. The value received on these pins (from the master device) is OR'd internally with the corresponding bit values out of the local GL_CR1 register. These inputs are used to allow the master processor to control all of the TLOP's not within its own device for global software control or for global OC-192c signal management. Refer to descriptions of the GL_CR1 register and the TL_CR{47} register for more detail regarding the usage and actions performed by these signals. |

Referring now to FIG. 8, an embodiment of the present invention shows a configuration of four processors interconnected to form an OC-192 processor card.

OC-192c concatenated streams are detected by use of the RX_192C_DETB 701 shown in FIG. 7, and TX_192C_DETB 705 wires for the receive path and transmit path respectively. These logical OR detection signals are monitored by all four devices but may only be driven by the three slave devices. A slave processor should drive one of the 192c detection lines if all of the respective LOP's (receive or transmit) within that device are indicating concatenation. This scheme is adopted such that if one of the slave processors fails (and ceases to see concatenation in all 48 of its LOP's) then one of the good slaves will still be asserting the 192c detection line, and 192c detection is not lost due to the failure of any one slave processor.

The master processor also drives control information to the downstream devices. The control signals are only observed at the slave processors 810, 812 and 814 if an OC192c signal is present. Thus, for example, if master processor is processor 816, slave processors 810, 812 and 814 determine that an OC-192c signal is present if they detect that the input side of their {RX,TX}_192C_DETB 701 and 705 signal is active low. The control signals driven from the master processor 816 to the slave processors 810, 812, and 814 are designed to synchronize the reading and writing of the FIFO's across all four processors (192 FIFO's). Additionally, global control signals (not shown) from the master processors GL_CR1 (Global Control Register #1) are driven to the slave devices 810, 812, and 814 such that only one Global Control Register is needed to perform certain global functions.

Referring now to FIG. 8, a configuration in accordance with an embodiment of the present invention shows a concatenated group of STS-1s in an STS-Nc dispersed across several integrated circuits 810, 812, 814 and 816. Each of the STS-1s contain part of the STS-Nc SPE rather than individual STS-1 SPEs. Integrated circuit 810 is the first integrated circuit. Although FIG. 8 shows four integrated circuits, the number of circuits is not limited according to an embodiment of the invention. The four integrated circuits are, according to one embodiment, application specific integrated circuits (ASICs) present on one communication module. Each of the four integrated circuits are coupled via a concatenation wire 850. Instead of passing the concatenation pattern shown in the H1 and H2 bytes from integrated circuit to integrated circuit, the method according to an embodiment of the present invention uses wire 850 to detect concatenation for all integrated circuits simultaneously.

The method applies to one or more integrated circuits that are concatenated. For example, if there are N integrated circuits, such as ASICs on a module and M STS-1s, and the division of STS-1s per ASIC is K, the master ASIC, or the integrated circuit hold the first STS-1 includes an input coupled to a wire, such as wire 850. The wire is driven as an input by any N−1 integrated circuits on the module. The N−1 integrated circuits drive the wire low when all K STS-1s internally are detected to be concatenation slaves. If not all the channels are slaves, the wire 850 tristates. Accordingly, the wire 850 is an active low if any one of the N−1 integrated circuits detects all K channels as "slaves."

In one embodiment, the wire 850 includes a pullup resistor to hold a signal high. For example, if each of the N−1 integrated circuits are tristated, the pullup resistor would be required to prevent the high signal from falling below a high signal level.

In one embodiment, the wiring of the integrated circuits causes a detection of multiple STS-1s if any of the N−1 integrated circuits drives the concatenation detection wire low and all channels other than the first channel on circuit 816 are concatenation slaves. For example, if an OC-192 STS-192 is transmitted using four ASICs with 48 channels per ASIC, according to the wiring scheme, M=192, N=4 and K=48, with one of the N integrated circuits being a master, if any one of the non-master integrated circuits detects all slaves on its integrated circuit, that one integrated circuit declares that all other channels on the non-slave integrated circuits are slaves and an STS-192c is declared.

According to an embodiment, the declaration by the one slave integrated circuit causes control signals to adjust to the STS-192c declaration. Further, according to an embodiment, the wire 850 requires only one external pin on an integrated circuit to perform the concatenation detection.

According to a further embodiment, the number N, identifying the number of integrated circuits coupled for concatenated payloads includes a number appropriate for detection of concatenation of different STS sized modules and integrated circuits, including those required for OC768 and OC-3072

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method for detecting concatenation of payload data, wherein the payload data is dispersed over a first integrated circuit and one or more subsequent integrated circuits, the method comprising:
   determining whether each of the one or more subsequent integrated circuits have all channels therein designated as concatenation slaves; and
   communicating the determination to the first integrated circuit, the determination indicating that the one or more subsequent integrated circuits are slaves.

2. The method of claim 1 further comprising:
   coupling the first integrated circuits to the one or more subsequent integrated circuits.

3. The method of claim 1 further comprising:
   detecting concatenation on a first integrated circuit of the one or more integrated circuits;
   assigning a bi-directional port coupled to the first integrated circuit as an input port; and
   assigning one or more bi-directional ports coupled to the one or more subsequent integrated circuits as output ports; and
   if any one integrated circuit among the one or more subsequent integrated circuits includes a channel therein designated as a slave channel, providing an active high signal to the output port, the active high signal coupled to the input port of the first integrated circuit.

4. The method of claim 1 wherein the detecting includes receiving a signal via a communication circuit including a wire coupling the one or more subsequent integrated circuits to the first integrated circuit.

5. The method of claim 1 wherein the determining and the communicating is performed on a line card for a synchronous optical network (SONET) communication system.

6. The method of claim 5 wherein the line card is disposed on a router.

7. The method of claim 4 wherein the communication circuit requires a single pin of the first integrated circuit to detect concatenation over the one or more subsequent integrated circuits.

8. The method of claim 1 wherein the communication circuit is disposed to detect concatenation over the one or more subsequent integrated circuits in an OC-192, an OC768 and an OC-3072 configuration.

9. The method of claim 1 further comprising:
   declaring a concatenation configuration, wherein the concatenation is across the one or more subsequent integrated circuits; and adjusting control signals for the concatenation configuration.

10. An apparatus for detecting concatenation of payload data, the apparatus comprising:

a first integrated circuit;

one or more subsequent integrated circuits coupled to the first integrated circuit, wherein the payload data is dispersed over the first integrated circuit and the one or more subsequent integrated circuits, the one or more subsequent integrated circuits coupled to determine whether each of the one or more subsequent integrated circuits have all channels therein designated as concatenation slaves; and a communication circuit coupled to the one or more subsequent integrated circuits and to the first integrated circuit to communicate the determination to the first integrated circuit, the determination indicating that the one or more subsequent integrated circuits are slaves.

11. The apparatus of claim 10 further comprising:

a bi-directional port disposed on the first integrated circuit, the bi-directional port assigned as an input port;

one or more bi-directional ports disposed on the one or more subsequent integrated circuits, wherein the one or more bi-directional ports are assigned as output ports, wherein the communication circuit is coupled to the one or more bi-directional ports and to the bi-directional port disposed on the first integrated circuit, the communication circuit communicating to the first integrated circuit whether any one of the one or more subsequent integrated circuits are concatenation slave circuits.

12. The apparatus of claim 11 wherein the first integrated circuit declares a concatenation configuration, the concatenation being across the one or more subsequent integrated circuits.

13. The apparatus of claim 12 wherein the first integrated circuit adjusts a plurality of control signals for the concatenation configuration.

14. The apparatus of claim 11 wherein if any one integrated circuit among the one or more subsequent integrated circuits includes a channel therein designated as a slave channel, the communication circuit provides an active high signal to the output port, the active high signal coupled to the input port of the first integrated circuit.

15. The apparatus of claim 11 wherein the communication circuit includes a wire.

16. The apparatus of claim 11 wherein the communication circuit includes a wire coupled to the first integrated circuit and to the one or more subsequent integrated circuits, the wire further coupled to a pull up resistor to enable one of an active low signal and a tri-stated signal.

17. The apparatus of claim 11 wherein the communication circuit is disposed within a line card of a router.

18. The apparatus of claim 11 wherein the communication circuit requires a single pin of the first integrated circuit to detect concatenation over the one or more subsequent integrated circuits.

19. The apparatus of claim 11 wherein the communication circuit is disposed to detect concatenation over,the one or more subsequent integrated circuits in an OC-192, an OC768 and an OC-3072 configuration.

20. The apparatus of claim 11 wherein the one or more subsequent integrated circuits includes three integrated circuits with 48 channels disposed on the combination of the first integrated circuit and the three integrated circuits, the subsequent integrated circuits coupled to the communication circuit to communicate to the first integrated circuit whether any one of the one or more subsequent integrated circuits are concatenation slave circuits, including communicating to the first integrated circuit if any of the three integrated circuits detects the channels thereon as all slave channels, the first integrated circuit responding to the communication by:

declaring an STS-192c configuration; and adjusting control signal for the STS-192c configuration.

21. A computer program product for directing control of communication signals in a concatenated payload, the computer program product comprising:

signal bearing media bearing programming adapted to detect concatenation of payload data, wherein the payload data is dispersed over a first integrated circuit and one or more subsequent integrated circuits, the programming further adapted to determine whether each of the one or more subsequent integrated circuits have all channels therein designated as concatenation slaves; and adapted to communicate the determination to the first integrated circuit, the determination indicating that the one or more subsequent integrated circuits are slaves.

* * * * *

UNITED STATES PATENT AND TRADEMARK OFFICE
CERTIFICATE OF CORRECTION

PATENT NO. : 6,735,197 B1  Page 1 of 1
DATED : May 11, 2004
INVENTOR(S) : Douglas E. Duschatko et al.

It is certified that error appears in the above-identified patent and that said Letters Patent is hereby corrected as shown below:

Column 22,
Line 15, please replace "over,the" with -- over the --.

Signed and Sealed this

Twenty-fifth Day of October, 2005

JON W. DUDAS
*Director of the United States Patent and Trademark Office*